United States Patent [19]
Mansson

[11] 3,786,347
[45] Jan. 15, 1974

[54] APPARATUS FOR GENERATING STABLE DRIVING PULSES FOR AN EDDY CURRENT TEST SYSTEM

[75] Inventor: Sven E. Mansson, Hollviksnas, Sweden

[73] Assignee: Magnetic Analysis Corporation, Mt. Vernon, N.Y.

[22] Filed: Dec. 21, 1972

[21] Appl. No.: 317,140

[52] U.S. Cl. ................................. 324/40, 307/261
[51] Int. Cl. ........................................... G01r 33/12
[58] Field of Search ................ 324/37, 40; 307/261

[56] References Cited
UNITED STATES PATENTS

| | | | |
|---|---|---|---|
| 3,229,197 | 1/1966 | Renken, Jr. | 324/40 |
| 3,314,006 | 4/1967 | Hentschel | 324/40 |
| 3,443,212 | 5/1969 | Renken | 324/40 |
| 3,391,336 | 7/1968 | Hentschel | 324/40 |

Primary Examiner—Robert J. Corcoran
Attorney—Willis H. Taylor, Jr. et al.

[57] ABSTRACT

Pulses for energizing an eddy current test coil assembly are produced by apparatus comprising a sine wave oscillator feeding a square wave generator, and a pulse generator and pulse hold-off circuit which produces output pulses corresponding to regularly recurring non-sequential excursions of one polarity of the square wave. The hold-off circuit includes a flip-flop which is reset at the trailing edges of the output pulses, and set at edges of the square wave next preceding the output pulses. The output pulses drive a test coil assembly for inducing eddy currents in an object under test and producing output signals varying with defects or flaws therein. The output signals pass to an amplifier tuned to the PRF of the pulses and then to a pair of gated phase-sensitive detectors Quadrature gates are developed from the hold-off circuit and a second similar circuit at times precisely related to the output pulses.

10 Claims, 4 Drawing Figures

APPARATUS FOR GENERATING STABLE DRIVING PULSES FOR AN EDDY CURRENT TEST SYSTEM

BACKGROUND OF THE INVENTION

Eddy current testing apparatus is well-known, and is particularly useful in the non-destructive testing of conductive objects to determine defects or flaws therein. In such apparatus a test coil assembly is energized to induce eddy currents in an object under test, and responds to changes in the eddy current flow to produce output signals varying with defects or flaws in the object.

In one type of apparatus objects of uniform cross-section such as bars, tubes, wires, etc. are continuously passed through a primary coil in the coil assembly, and a pair of secondary coils connected in series opposition produce a null output when the eddy current field is uniform. Then, any discontinuities in the object which alter the eddy current magnitude or distribution will produce output flaw signals which are detected and indicated in a desired manner. Instead of having the object pass through the coil assembly, the assembly may be arranged as a probe which is moved relative to the surface of the object under test.

Another type of eddy current test apparatus operates as a comparator, that is, an object is placed in one set of coils and the resultant signal compared with that of a reference object placed in another set of coils. Here also, the secondary coils are commonly connected in opposition to produce a null signal when the objects are alike, and an output signal when they are unlike.

Frequently the test coil assembly is energized with alternating current and the output signal, modulated in amplitude or phase, or both, by defects or flaws is supplied to a pair of phase-sensitive detectors which are gated to produce guadrature signal components which are processed and supplied to a cathode ray oscilloscope to produce a polar coordinate display of the signal amplitude and phase. One or the other of these quadrature components may be supplied to indicator apparatus such as a chart recorder or alarm system.

Pulse excitation of a test coil assembly is also known in which DC pulses are applied to the test coil assembly. The output signal is then gated to produce signals varying with changes in the object under test. In such case it is important to control closely the duration of the pulses, the pulse amplitude and the pulse repetition frequency (PRF) to avoid extraneous signals and noise which might mask the defect or flaw signals. Also, the spacing of the sampling gates should be closely controlled.

In practical test equipment it is frequently desirable to change the PRF of the pulses, with accompanying change in the pulse duration, so as to change the penetration of the eddy currents in the object under test.

The present invention is particularly directed to the generation of stable driving pulses, while allowing the PRF to be selected as desired. A further feature is to provide quadrature gating pulses which are precisely related to the applied pulses.

SUMMARY OF THE INVENTION

In accordance with the invention a sine wave oscillator is employed, and the desired pulses are derived from the output thereof. Such oscillators are capable of high stability without undue expense, as by using a high Q tuned circuit, and the frequency can readily be changed by changing the tuned circuit.

The sine wave from the oscillator is supplied to a square wave generator which produces a square wave having the same frequency. The square wave is supplied to a pulse generator, and a pulse hold-off circuit cooperates therewith to produce output pulses corresponding to regularly recurring non-sequential excursions of one polarity of the square wave supplied to the pulse generator. Thus the output pulses accurately correspond to the selected excursions of the square wave.

The pulse hold-off circuit includes flip-flop means having set and reset states, and control means are provided which is responsive to the set and reset states for respectively allowing and preventing the production of output pulses by the pulse generator. Advantageously the control means includes short-circuiting means which substantially short-circuits the input of the pulse generator to prevent portions of the square wave from producing output pulses, the short-circuit being removed to allow the production of the desired output pulses.

Resetting means is provided which is responsive to the trailing edges of output pulses to reset the flip-flop means and disable the pulse generator, preferably by differentiating the output pulses to produce resetting trigger pulses. Setting means is provided which is responsive to a square wave from the square wave generator to set the flip-flop means at or after the trailing edges of excursions of said one polarity next preceding the utilized non-sequential excursions but prior to the utilized excursions. Preferably the square wave is differentiated to produce setting trigger pulses at edges of the square wave next preceding the output pulses. The resetting may be accomplished by a short-circuiting device at the input of the flip-flop means which is triggered to establish the short-circuit briefly, and has a high resistance thereafter which forms part of the differentiating circuit for the square wave.

The resultant output pulses are amplified as required and utilized to drive test coil means for inducing eddy currents in an object under test and producing output signals varying with defects or flaws in the object.

It is particularly contemplated to eliminate alternate excursions of one polarity of the square wave, thereby yielding output pulses having a 25 percent duty cycle and a PRF one-half the initial sine wave frequency. However, smaller duty cycles may be obtained by eliminating more than one excursion between those yielding output pulses.

The PRF of the driving pulses can readily be changed by changing the frequency of the sine wave oscillator, while maintaining accurate pulse generation. For a given duty cycle, changing the PRF changes the pulse width and hence the depth of penetration.

With pulse excitation it has been found advantageous to supply the output signals to an amplifier which is tuned to emphasize signals corresponding to defects or flaws, and largely eliminate extraneous signals and noise, particularly any ringing in the test coil assembly which persists between applied pulses. With output pulses having a 25 percent duty cycle, tuning to the PRF of the pulses is preferred. This yields a signal having a strong frequency component at the PRF, and allows a high gating rate to be employed and high test speed. The resultant signal is then supplied to phase-sensitive detector means for developing signals corresponding to the defects or flaws, and the signals are subsequently processed and indicated or displayed in known manner.

Tuning the amplifier to other than the PRF of the driving pulses is possible, particularly with less than 25 percent duty cycle, as will be described hereinafter.

For display on a cathode ray oscilloscope, quadrature signals are desired, and to this end the output of the tuned amplifier can be supplied to a pair of quadrature gated detectors.

With fixed gating, quadrature signals permit obtaining full information concerning defects or flaws, and for some applications fixed quadrature gating may suffice. In such case the invention provides means for generating quadrature gates accurately related to the output pulses driving the test coil means. To this end, differentiating means responsive to the setting of the hold-off flip-flop produces late gate pulses. A similar flip-flop is reset at the end of an output pulse simultaneously with the hold-off flip-flop, and set at the leading edge of the square wave applied to the pulse generator next following an output pulse. Differentiating means responsive to the setting of the second flip-flop produces early gate pulses. Since the late and early gate pulses are definitely related to the square wave from which the output pulses are produced, stable timing with respect to the output pulses is assured. Specifically, with 25 percent duty cycle pulses, the early gate pulses occur one-quarter cycle after the driving pulses, and the late gate pulses one-quarter cycle after the early gate pulses.

Further features of the invention will in part be pointed out in the following description of specific embodiments thereof, and in part be understood therefrom.

DESCRIPTION OF THE SPECIFIC EMBODIMENTS

Figure 1:
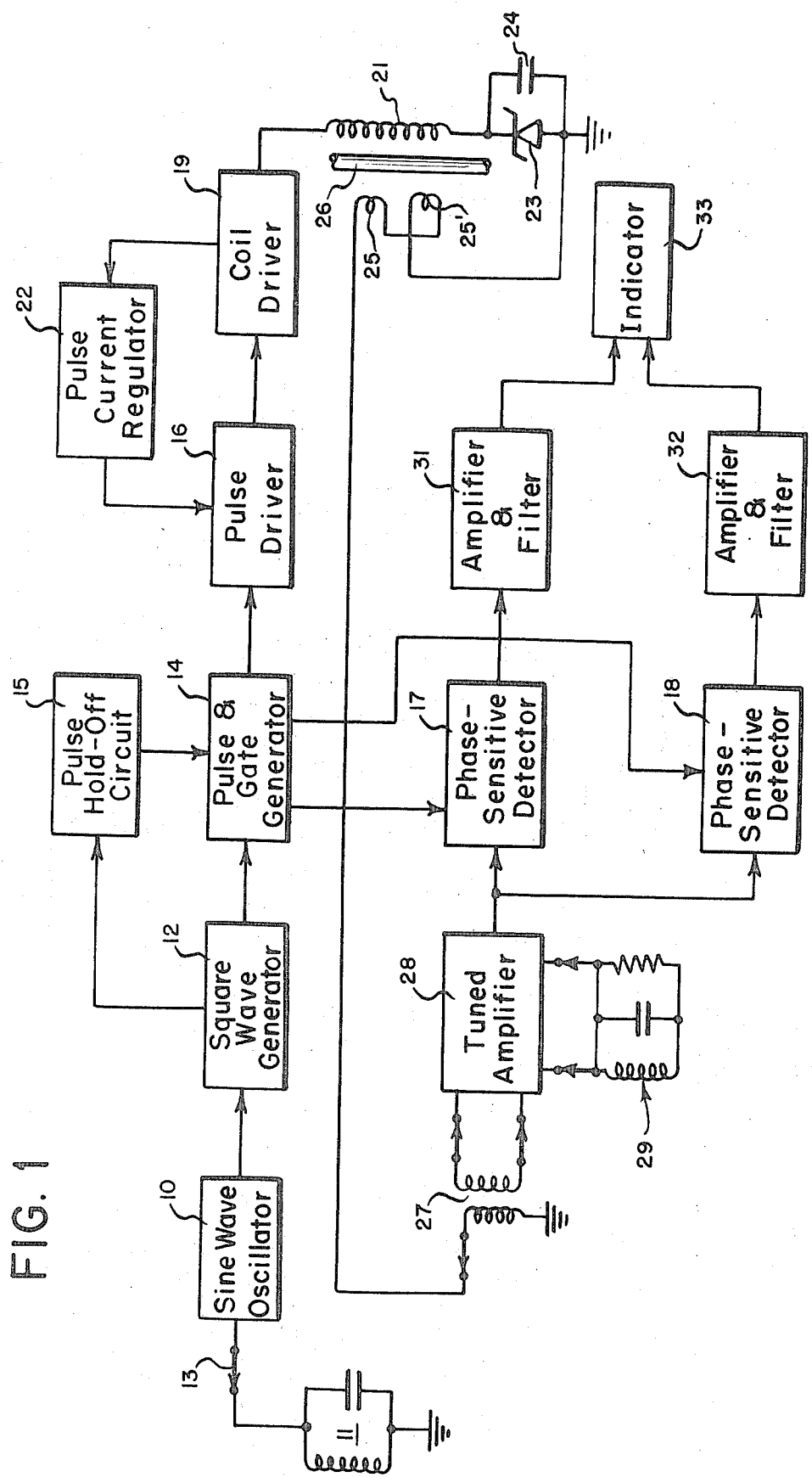
FIG. 1 is a block diagram of a pulse eddy current flaw detector in which the invention may be employed.

Referring to FIG. 1, a sine wave oscillator 10 including a tank circuit 11 supplies a sine wave to a square wave generator 12. Different tank circuits may be connected to oscillator 10 through switch 13 so that the frequency of the sine wave can be selected as desired. Output of the square wave generator are supplied to a pulse and gate generator 14 and to a pulse hold-off circuit 15.

The pulse hold-off circuit functions to alternatively allow and prevent the production of output pulses by the pulse generator in 14, so that the output pulses correspond to regularly recurring non-sequential excursions of one polarity of the square wave supplied to the pulse generator. Accordingly output pulses are supplied to pulse drive 16 of desired duty cycle in which the pulses are precisely related in time occurrence and duration to the half-cycles in the input square wave which are not eliminated by the hold-off circuit. Thus, if alternate excursions of one polarity of the input square wave are eliminated, output pulses of 25 percent duty cycle and a PRF (pulse recurrence frequency) half the frequency of the input square wave, and hence half the frequency of the initial sine wave, may be produced.

Generator 14 also produces quadrature gating pulses which are supplied to phase-sensitive detectors 17, 18.

Output pulses from the pulse driver 16 are fed to coil driver 19 and thence to the primary winding 21 of an eddy current flaw detector coil assembly. A pulse current regulator 22 is provided to insure that constant current pulses are applied to the primary coil, and is described and claimed in application Ser. No. 328,889, filed Feb. 1, 1973, by Sven E. Mansson for Current Regulator For Pulsed Eddy Current Tester. A Zener diode 23 and shunt capacitor 24 provides a discharge path to release the energy stored in primary 21 at the end of a driving pulse, and is also described in the aforesaid application.

Two secondary coils 25, 25' are connected in series opposition to form a null coil arrangement which yields little or no output in the absence of a flaw or other irregularity in the object 26 fed therethrough, but yields an output varying in amplitude and/or phase in the presence of a flaw or other irregularity. The output of the null coils is supplied through a switchable transformer 27 to a tuned amplifier 28 which includes a switchable tuned circuit 29. Different transformers and tuned circuits may be switched into operation along with the switching of the oscillator tank circuit 11.

With driving pulses of 25 percent duty cycle applied to primary coil 21, there will be a strong frequency component at the PRF of the pulses in the secondary coils in the presence of flaws, etc. It is preferred to tune the amplifier 28 to the PRF of the driving pulses so as to obtain a maximum signal response to flaws, etc. Also, the tuning serves to reduce noise and undesired frequency components which may exist in the output of null coils 25, 25'. The bandwidth of the tuned amplifier should be sufficient to encompass side-bands resulting from flaws, etc.

With a 25 percent duty cycle the duration of a pulse is one-quarter wavelength when the amplifier is tuned to the PRF, and this has been found desirable for high efficiency. This corresponds to tuning to one-half the initial sine wave frequency. However, tuning to the second or perhaps higher harmonics of the PRF may be desirable in some cases, so that in general it is desirable to tune the amplifier to a multiple of the PRF, or a multiple of one-half the sine-wave frequency, the term multiple being understood to include "1".

For duty cycles less than 25 percent, tuning to a frequency such that the pulse width is one-quarter wavelength is desirable to obtain good signal response. Inasmuch as the pulse width will still be one-half cycle of the initial sine wave, this corresponds to tuning to one-half the sine wave frequency.

The output of the tuned amplifier 28 is supplied to the phase-sensitive detectors 17, 18, along with the quadrature gates from generator 14, to produce quadrature signal components. These are fed to respective amplifiers and filters 31, 32 and then to an indicator 33 such as a cathode-ray tube, in accordance with known practice.

Figure 2:
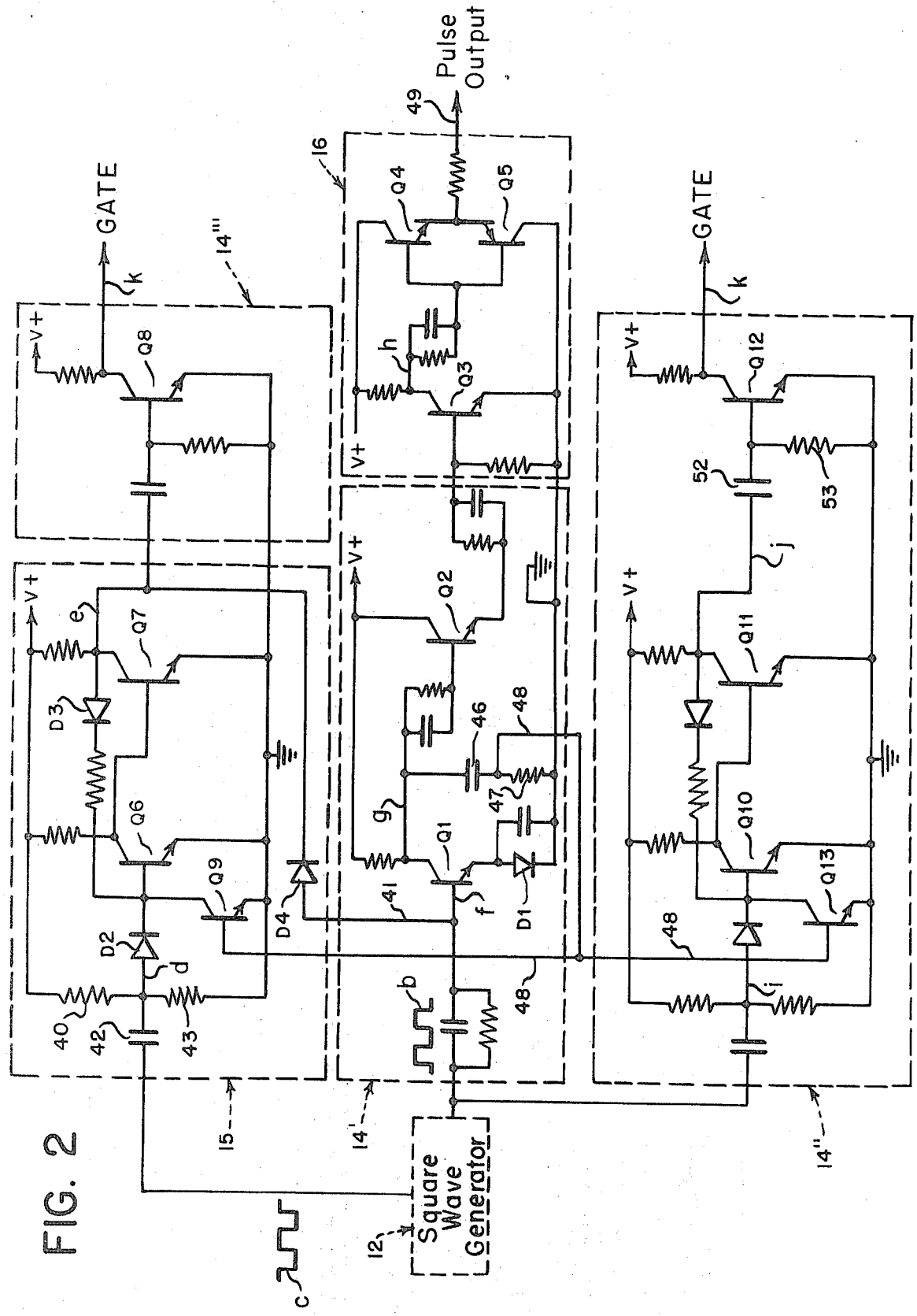
FIG. 2 is a circuit diagram of a pulse and quadrature gate generator in accordance with the invention.
Figure 3:
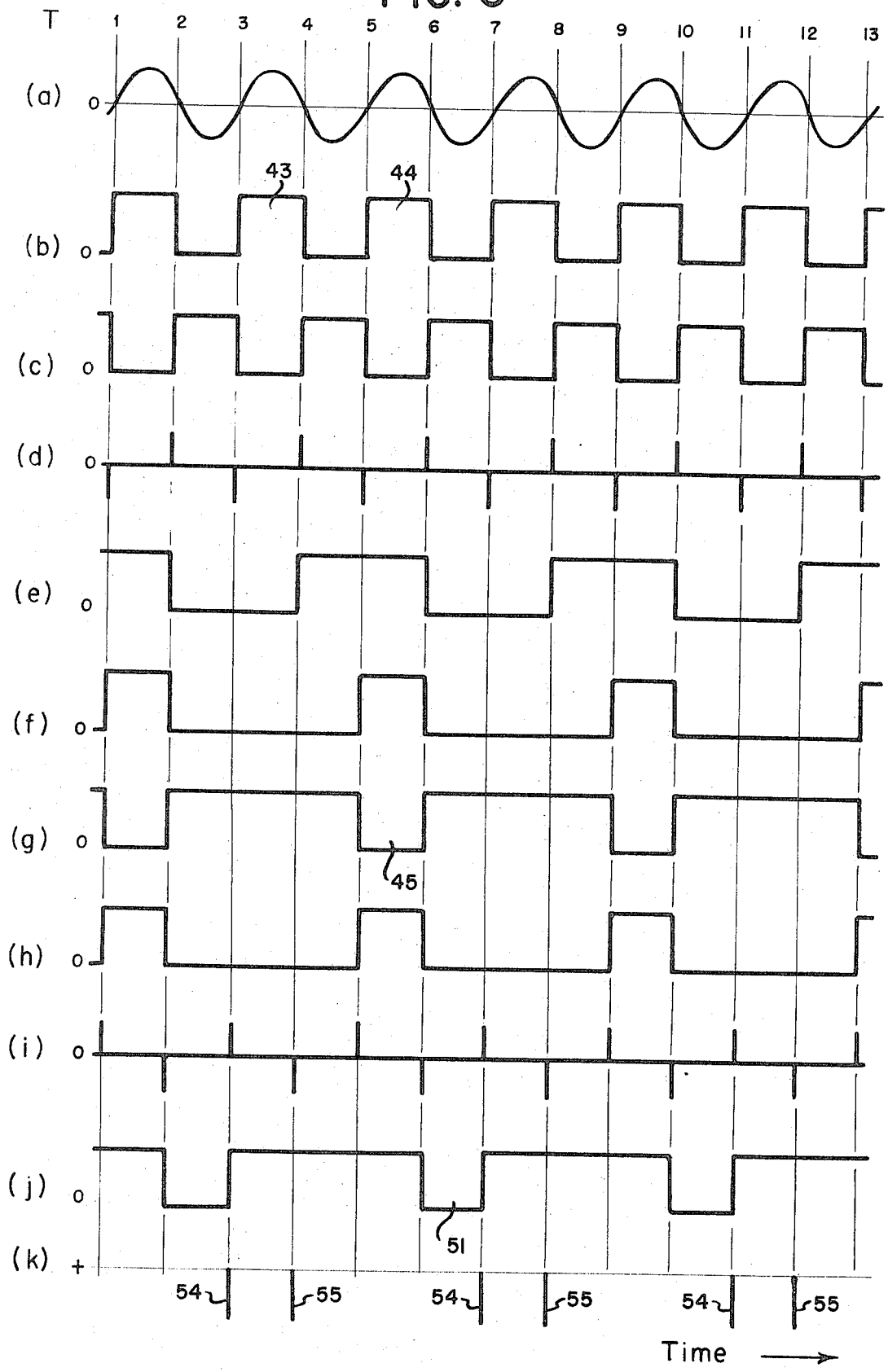
FIG. 3 shows waveforms for FIG. 2.

Referring to FIGS. 2 and 3, a circuit diagram and waveforms are shown for generator 14 and hold-off circuit 15 of FIG. 1. Pulse driver 16 is also shown, omitting components thereof relating to the current regulation of the above-identified application. Letters b-k on FIG. 2 refer to corresponding wave-forms in FIG. 3. Dotted blocks 14', 14'' and 14''' are portions of block 14 in FIG. 1, separated for convenience. Block 14' is primarily concerned with driving pulse generation, whereas blocks 14'' and 14''' are primarily concerned with generating early and late quadrature gating pulses. In FIG. 3 the reference level "0" indicates voltage levels at or near ground potential or other reference potential, and level "+" indicates a voltage positive to ground, so as to indicate the direction of the pulse excursions. FIG. 3 is primarily a timing diagram, and differences in amplitude are not shown. For convenient reference, times T1 – T13 are shown at the top of the figure.

The transistors in FIG. 2 are of the NPN type (except Q5) with the emitter arrow pointing away from the base, but it will be understood that PNP transistors could be employed if desired, with appropriate change of voltages, etc., as will be understood by those skilled in the art.

Square wave $b$ from generator 12 is supplied through a coupling circuit to the base of transistor Q1. Emitter bias is supplied by diode D1 shunted by a capacitor. A hold-off voltage is supplied through line 41 from the hold-off circuit 15 to eliminate alternate positive excursions of the square wave and yield waveform $g$ at the collector output of Q1, the pulses amplified by Q1 being inverted in polarity as shown in FIG. 3($g$).

The hold-off voltage is developed in block 15. An inverted square wave $c$ is developed in generator 12, as by feeding square wave $b$ to an inverting amplifier. The inverted wave is supplied to a differentiating circuit including capacitor 42 and resistor 43, to produce short spikes or trigger pulses of opposite polarity at the leading and trailing edges as shown in FIG. 3($d$). Positive triggers pass through D2 to the base of Q6, negative triggers being ineffective as will be described. Transistors Q6, Q7 are connected as a flip-flop with feed-back through diode D3 and a series resistor. Q9 is normally off (non-conducting).

The base of Q6 is slightly positively biased through resistors 40, 43 and D2 and the circuit constants of the flip-flop are selected so that, when Q6 is off, its base bias is only slightly below its trigger level so as to speed up triggering for high speed operation.

Assuming that Q6 is initially off, Q7 will be on (conducting) and the output of Q7 will be low (near ground) as shown for example in FIG. 3($e$) between times T2 and T4. Feed-back from Q7 will maintain the base of Q6 low, and negative triggers in $d$ will be ineffective. Diode D2 further assures that negative triggers will have no effect. At T4 a positive trigger in $d$ will turn Q6 on, and hence Q7 off, so that the output of Q7 will go high (near V+) as shown in FIG. 3($e$) between T4 and T6.

While Q7 is on between T2 and T4, its low output to diode D4 will maintain line 41 low and hold the base of Q1 near ground. This, together with the bias on Q1, substantially short-circuits the Q1 input. Thus the positive excursion 43 of square wave $b$ between T3 and T4 will be ineffective, as shown at $f$. However, when Q7 goes off and its output $e$ goes high at T4, diode D4 will be back biased and its short-circuiting effect removed. The next positive excursion 44 of square wave $b$ will be effective at Q1 to turn it on, and its output $g$ will go low to produce pulse 45. As will be noted, pulse 45 in an inverted replica of pulse 44 thus assuring precise timing and duration of the pulse.

The output circuit of Q1 includes a differentiating circuit comprising capacitor 46 and resistor 47, producing negative and positive trigger pulses in line 48 at the leading and trailing edges of pulse 45. Line 48 is connected to the base of Q9 and negative triggers will be ineffective. However, the positive trigger at the trailing edge of pulse 45 at T6 causes Q9 to conduct, thus bringing the base of Q6 to substantially ground level and turning it off. This turns on Q7 and causes its output $e$ to go low at T6. Q6 and Q7 are now in their initially assumed conditions and the sequence of operations repeats. It may be noted that the positive trigger in $d$ at T6 will be ineffective, due to the short-circuiting action of Q9 at the time it occurs.

The overall result is a pulse wave at $g$ in which the PRF is one-half the frequency of the square wave at $b$ and the sine wave at $a$ in FIG. 3. Wave $g$ has a 25 percent duty cycle and the pulses accurately coincide with corresponding alternate positive excursions of $b$ and half-cycles of $a$.

The pulses from Q1 are supplied to Q2 functioning as an emitter follower and thence to Q3 serving as an amplifier and inverter. The output of Q3 is shown in FIG. 3($h$) and is supplied to the inputs of Q4, Q5 connected as a complementary amplifier, thus yielding an amplified pulse output at line 49 which is utilized to drive primary coil 21 (FIG. 1).

As mentioned above, quadrature gate pulses are developed which are precisely related to the pulses applied to coil 21. These may be termed early and late gates, spaced 90° apart with respect to the fundamental frequency of the coil pulses which is equal to the PRF.

The early gate pulses are developed in block 14''. The circuit comprising Q10, Q11 and Q12 is the same as that in block 15, except that no hold-off output is fed to block 14'. The non-inverted square wave $b$ is supplied to block 14'' so that differentiated triggers $i$ are supplied to Q10 which coincide with triggers $d$ applied to Q6 but are of opposite polarity. Q10 is turned off simultaneously with Q6 at T6, by a trigger pulse through line 48 to Q13 at the end of a driving pulse 45. This turns on Q11 and causes its output $j$ to go low at T6. The next positive trigger in $i$ at T7 turns Q10 on and Q11 off, hence causing $j$ to go high at T7. Thus a pulse 51 is produced. Negative triggers in $i$ are ineffective to turn Q10 off, as explained in connection with block 15, and the positive trigger in $i$ at T9 has no effect since Q10 is already on. Consequently Q10 remains on until it is turned off by a positive trigger in line 48 at T10. The operation then repeats.

The output $j$ of Q11 is supplied to a differentiating circuit comprising capacitor 52 and resistor 53, and the resultant triggers are supplied to the base of Q12. Normally Q12 is off so that negative triggers are ineffective, and its output is high, as shown in FIG. 3($k$). At the end of each pulse 51 in $j$, the output of Q11 goes high to produce a positive trigger which actuates Q12 to produce negative-going early gates 54 as shown in FIG. 3($k$).

Late gates are produced from the output *e* of Q7, since *e* goes positive one-quarter cycle later than gates 54. Output *e* is supplied to a differentiating circuit and Q8, which functions like Q12 and produces late gates 55 in FIG. 3(*k*).

As will be observed, both gates are derived from waveforms which are precisely related to the initial square and sine waves. The same applies to the driving pulses in *g* and *h* Thus precise timing of both the pulses applied to primary coil 21 (FIG. 1) and the quadrature gating pulses applied to the detectors 17, 18 is assured.

It will be recognized that with proper design, the pulse and gate generator is capable of functioning over a considerable range of frequencies, as determined by the switchable components of FIG. 1. At each frequency the stability of the sine wave oscillator determines the stability of the pulse and gate generation, and stable sine wave oscillators may be built without undue expense. For a wide range of selectable frequencies, e.g. from 2.5 KH to 600 KH, it may be desired to change certain circuit constants. For example, it may be desirable to reduce the value of the differentiating resistor 53 at the input of Q12, and similarly for Q8, to reduce the time constant at higher pulse rates. In such case, short-circuiting transistors may be connected across respective portions of the resistors, and actuated along with the switchable components.

In the above description the flip-flops have two stable states which have been described in terms of "on" and "off" conditions of the transistors thereof. Conveniently the two states may be described as "set" and "reset" states. In this terminology, the flip-flops are reset at the trailing edges of the output pulses through line 48. The hold-off flip-flop is set by trigger pulses at edges of the square wave next preceding the output pulses, and the early gate flip-flop is set at the edge of the square wave next following the output pulses.

The gate circuits of FIG. 2 produce quadrature gates which are in fixed time relationship to the output pulses applied to coil 21, and occur after the output pulses have terminated. Thus no power is being supplied to coil 21 when gating takes place.

Figure 4:
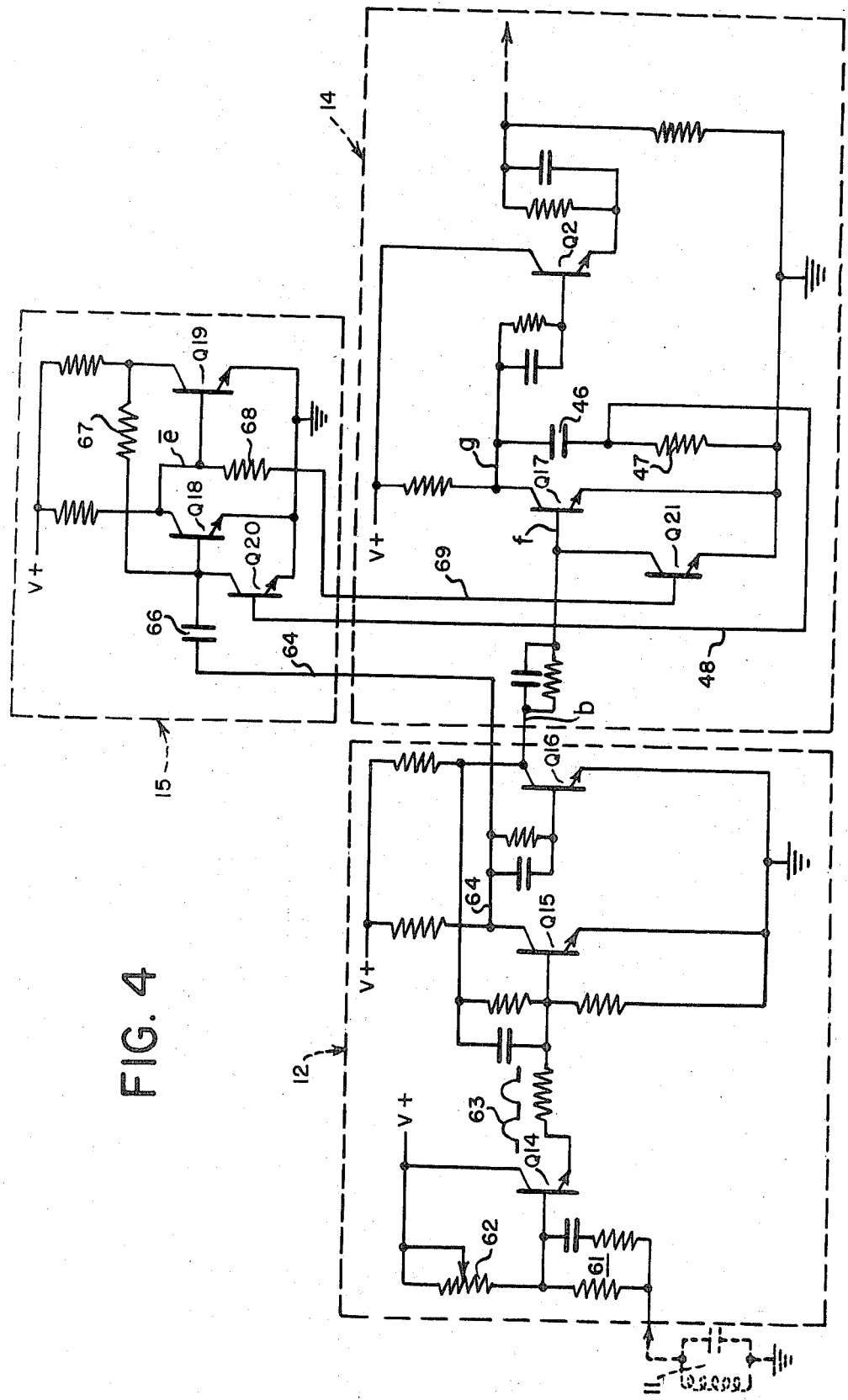
FIG. 4 is a circuit diagram of a modified pulse generator of the invention.

In applications where it is desired to gate the detectors at different times from those illustrated in FIG. 3(*k*), while preserving precise driving pulse generation, the gating portions of FIG. 2 may be omitted. Also, somewhat less precise setting of the hold-off circuit is possible without impairing the driving pulse generation, since the hold-off circuit is not used for gate pulse generation. FIG. 4 illustrates a somewhat simpler driving pulse generator.

Referring to FIG. 4, block 12 shows a square wave generator, block 14 is a modified pulse generator, and block 15 is a modified hold-off circuit.

The tank circuit 11 of the oscillator 10 is shown in phantom, and the sine wave thereacross is supplied through a coupling circuit 61 to Q14. Q14 functions as an emitter follower and its base it biased by the coupling circuit and adjustable resistors 62 to a point between ground and V+ to eliminate negative excursions of the sine wave and yield an output 63 of 50 percent duty cycle. This is supplied to a square wave generator including Q15 and Q16.

Q15 conducts on positive excursions of input wave 63 and clips the wave to yield an inverted square wave in line 64 similar to that shown in FIG. 3(*c*) but not necessarily as perfect. That is, the sides of the wave may be less steep and the corners may be slightly rounded. This wave is supplied to Q16 which further amplifies, clips and inverts to yield a good square wave in its output line like that shown in FIG. 3(*b*).

The square wave is supplied to Q17 in pulse generator block 14. Q17 functions similarly to Q1 in FIG. 2 but the circuit is simplified by omitting the diode and shunt capacitor in its emitter circuit and the hold-off signal is applied differently.

The hold-off circuit in block 15 is a flip-flop including Q18 and Q19, functioning similarly to Q6 and Q7 in FIG. 2, but simplified by omitting the diodes D2 and D3 and the input biasing resistors. Here capacitor 66 and Q20 form a differentiating circuit for the inverted square wave applied through line 64. Q20 is off, and hence of high resistance, except at the trailing edges of output pulses such as 45 in FIG. 3(*g*). The differentiation of the inverted square wave in line 64 produces positive and negative triggers similar to those shown in FIG. 3(*d*) although they may be less sharp. This can be tolerated in this embodiment, as will be explained.

As previously explained, at the end of a driving pulse from Q17 as shown in FIG. 3(*g*), say at T2, a positive trigger in line 48 will turn Q20 on, thereby turning Q18 off. The simultaneous occurrence of a positive trigger in *d* at T2 will be ineffective due to the short-circuiting action of Q20, and also since the low resistance of Q20 will practically eliminate differentiation. Q19 will be turned on and the feed-back through resistor 67 will maintain Q18 off. The negative trigger at T3 in *d* will be ineffective, but the next positive trigger at T4 will turn Q18 on and reverse the flip-flop. The output of Q18 will be high from T2 to T4, the inverse of *e*, as indicated by $\bar{e}$. This output is fed through resistor 68 and line 69 to the base of Q21, thus turning Q21 on and short-circuiting the input of Q17. Thus the positive excursion 43 of *b* will be eliminated. From T4 to T6 the output of Q18 will be low, thus turning Q21 off and allowing Q17 to pass the next positive excursion 44 of *b*. Accordingly the input *f* and output *g* of Q17 will be the same as in FIG. 2. The use of the inverted waveform $\bar{e}$ in FIG. 4 is because Q21 is used to disable the input of Q17, rather than the diode D4 of FIG. 2.

The use of a less perfect inverted square wave in line 64, mentioned above, is permitted in FIG. 4 without affecting the accuracy of pulse generation. A slight delay in turning Q18 on after T4 can be tolerated, since the next positive excursion of square wave *b* occurs at T5. The termination of pulse 45 in the output of Q17 turns Q18 off as in FIG. 2. Thus the output pulses *g* from Q17 accurately correspond to alternate positive excursions of square wave *b*.

The output of Q17 is supplied to Q2 and subsequent portions of the circuit may be in block 14' of FIG. 2.

The terminology "set" and "reset" may be applied to FIG. 4 as described in connection with FIG. 2.

In the foregoing embodiments direct and inverted square waves are supplied to the pulse generator and hold-off circuits to secure the desired timing. It will be understood that the choice depends on the detailed circuit design, for example direction of triggering, etc. The various V+ voltages may be selected in view of the detailed design.

If less than 25 percent duty cycle is desired, the pulse hold-off circuit may be modified to eliminate the effect of one or more trigger pulses following reset by an output pulse before the circuit enables the pulse generator to pass the next excursion of the square wave.

Although the block diagram of FIG. 1 specifically illustrates a flaw detector, it will be understood that the pulse generators, and gate generators if desired, may be used on other types of eddy current testing apparatus such as the comparators, etc., previously mentioned. It will also be understood that various features of the invention may be employed, and others omitted, as meets the requirements of a particular application, and the detailed circuit design changed as desired.

I claim:

1. Pulse eddy current testing apparatus which comprises
    a. a sine wave oscillator,
    b. a square wave generator supplied with the sine wave from said oscillator for producing a square wave therefrom having the same frequency,
    c. a pulse generator supplied with said square wave and a pulse hold-off circuit cooperating therewith for producing output pulses corresponding to regularly recurring non-sequential excursions of one polarity of the square wave supplied to the pulse generator,
    d. said pulse hold-off circuit including flip-flop means having set and reset states,
    e. control means responsive to the set and reset states of said flip-flop means for respectively allowing and preventing the production of output pulses by said pulse generator,
    f. resetting means responsive to the trailing edge of an output pulse from said pulse generator for resetting said flip-flop means,
    g. setting means responsive to a square wave from said square wave generator for setting said flip-flop means at or after the trailing edges of excursions of said one polarity next preceding said non-sequential excursions but prior to said non-sequential excursions,
    h. test coil means for inducing eddy currents in an object under test and producing output signals varying with defects or flaws in the object,
    i. and means for utilizing said output pulses to drive said test coil means.

2. Apparatus in accordance with claim 1 in which said setting means sets said flip-flop means at or after the trailing edges of alternate excursions of said one polarity of the square wave supplied to said pulse generator but prior to the respective next excursions thereof, whereby output pulses of 25 percent duty cycle and a PRF one-half the frequency of said sine wave oscillator are produced.

3. Apparatus in accordance with claim 1 in which said control means includes short-circuiting means responsive to the reset state of said flip-flop means to short-circuit the input of said pulse generator.

4. Apparatus in accordance with claim 1 in which said setting means includes means for differentiating a square wave from said square wave generator to produce setting trigger pulses at edges of the square wave next preceding said output pulses respectively, and means for utilizing said setting trigger pulses to set said flip-flop means.

5. Apparatus in accordance with claim 4 in which the square wave supplied to said setting means is inverse with respect to the square wave supplied to said pulse generator.

6. Apparatus in accordance with claim 5 in which said resetting means includes means for differentiating the output pulses of said pulse generator to produce resetting trigger pulses at the trailing edges thereof, and short-circuiting means responsive to said resetting trigger pulses for resetting said flip-flop means, said short-circuiting means having a high resistance in the non-short-circuiting condition thereof and forming part of the means for differentiating the square wave to produce said setting trigger pulses.

7. Apparatus in accordance with claim 1 including a tuned amplifier supplied with said output signals of the test coil means, said amplifier being tuned to a frequency substantially one-half the frequency of said sine wave oscillator, and gated phase-sensitive detector means supplied with the output of said amplifier for producing signals corresponding to said defects or flaws in the object.

8. Apparatus in accordance with claim 2 including a tuned amplifier supplied with said output signals of the test coil means, said amplifier being tuned to substantially a multiple (including 1) of the PRF of said output pulses, and gated phase-sensitive detector means supplied with the output of said amplifier for producing signals corresponding to said defects or flaws in the object.

9. Apparatus in accordance with claim 8 in which said amplifier is tuned to substantially the PRF of said output pulses.

10. Apparatus in accordance with claim 9 in which said resetting means includes means for differentiating the output pulses of said pulse generator to produce resetting pulses at the trailing edges thereof for resetting the flip-flop means, said flip-flop means is set at the trailing edges of alternate excursions of said one polarity of the square wave supplied to said pulse generator, and said gated phase sensitive detector means includes a pair of gated phase-sensitive detectors, and including means for generating early and late gate pulses for respective detectors comprising
    a. a differentiating means responsive to the setting of said flip-flop means for producing said late gate pulses,
    b. second flip-flop means having set and reset states,
    c. means for utilizing said resetting trigger pulses to reset said second flip-flop means,
    d. means for differentiating a square wave from said square wave generator to produce setting trigger pulses at edges thereof next following said output pulses respectively,
    e. means for utilizing the last-mentioned setting trigger pulses to set said second flip-flop means,
    f. and differentiating means responsive to the setting of said second flip-flop means for producing said early gate pulses.

* * * * *